(12) United States Patent
Shaw

(10) Patent No.: US 7,380,167 B2
(45) Date of Patent: May 27, 2008

(54) METHOD AND SYSTEM FOR VERIFYING INFORMATION HANDLING SYSTEM HARDWARE COMPONENT FAILURE DIAGNOSIS

(75) Inventor: Jeff Alton Shaw, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1156 days.

(21) Appl. No.: 10/365,855

(22) Filed: Feb. 13, 2003

(65) Prior Publication Data
US 2004/0163011 A1   Aug. 19, 2004

(51) Int. Cl.
*G06F 11/00* (2006.01)
(52) U.S. Cl. .................................................. 714/25
(58) Field of Classification Search ............... 714/25, 714/13, 15, 26, 32, 52, 57, 27, 37
See application file for complete search history.

(56) References Cited

U.S. PATENT DOCUMENTS

| | | | | |
|---|---|---|---|---|
| 4,701,845 A * | 10/1987 | Andreasen et al. | ............ | 714/31 |
| 5,400,018 A * | 3/1995 | Scholl et al. | ............... | 340/10.3 |
| 5,968,187 A | 10/1999 | Robinson | ..................... | 714/25 |
| 6,043,461 A * | 3/2000 | Holling et al. | ............ | 219/445.1 |
| 6,260,160 B1 | 7/2001 | Beyda et al. | .................. | 714/27 |
| 6,367,035 B1 | 4/2002 | White | .......................... | 714/40 |
| 6,519,735 B1 * | 2/2003 | Holman et al. | ............. | 714/763 |
| 6,654,915 B1 * | 11/2003 | Lu et al. | ......................... | 714/57 |
| 6,862,554 B2 * | 3/2005 | Ng | ................................ | 702/184 |
| 2001/0013109 A1 * | 8/2001 | Daimon et al. | ................ | 714/57 |
| 2002/0007285 A1 * | 1/2002 | Rappaport | ...................... | 705/2 |
| 2002/0133575 A1 | 9/2002 | Cidon et al. | ................. | 709/220 |
| 2003/0204372 A1 * | 10/2003 | Ng | ................................ | 702/184 |
| 2004/0176964 A1 * | 9/2004 | Ghaffar et al. | .................. | 705/1 |

* cited by examiner

*Primary Examiner*—Nadeem Iqbal
(74) *Attorney, Agent, or Firm*—Hamilton & Terrile, LLP; Robert W. Holland

(57) ABSTRACT

Hardware component failure diagnosis of an information handling system is verified with a hardware diagnostics code generated by a diagnostics module integrated with an information handling system and sent from the information handling system to a diagnostics engine of a service center. The hardware diagnostics code includes a unique identifier for the information handling system and a hardware component failure code that identifies the type of hardware and type of failure. The diagnostics engine analyzes the hardware diagnostics code to confirm that diagnostics were run on the information handling system and, for authentic hardware failures, automatically initiates the sending of a replacement hardware component to the information handling system.

7 Claims, 4 Drawing Sheets

METHOD AND SYSTEM FOR VERIFYING INFORMATION HANDLING SYSTEM HARDWARE COMPONENT FAILURE DIAGNOSIS

BACKGROUND OF THE INVENTION

1. Field of the Invention

The present invention relates in general to the field of servicing information handling system failures, and more particularly to a method and system for verifying information handling system hardware component failure diagnosis.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The wide variety of uses and flexibility of information handling systems has resulted in the manufacture of a wide variety of hardware and software information handling system configurations. One difficulty with operation of a wide variety of hardware and software configurations is that a failure of an information handling system is often difficult to diagnose and correct. Typically, information handling system manufacturers have service centers that aid information handling system users with failures. Generally, the user calls a toll free number of a service center and describes the difficulty to a service technician who attempts to diagnose and correct the problem by describing corrective actions for the user to perform. However, user calls to a service center are expensive for the manufacturer and often an inefficient use of technician time. For instance, resolution of hardware versus software difficulties typically rely on different types of expertise. Thus, isolating and correcting a difficulty may result in the user having to talk with different technicians and, ultimately, end up with replacement hardware components being shipped to the user.

In order to aid in resolution of information handling system difficulties, diagnostics modules are sometimes installed on information handling systems, either during manufacture or during subsequent use, such as through a diagnosis performed on the information handling system through the Internet. If a user has difficulty with the information handling system, the user runs the diagnostics module to attempt to isolate the problem, thus reducing the time needed by the user to talk with a technician. Further, a hardware component failure diagnosed by a diagnostics module is more likely to be correct than a technician analysis accomplished by a phone conversation and thus use of a diagnostics module reduces the risk that a replacement component will be shipped when the original equipment is not faulty. In some instances, seventy percent of hardware components replaced by technician diagnosis cannot duplicate the reported failure on return to the manufacturer. Although the use of the diagnostic module improves the accuracy of hardware component failure diagnosis, often users and technicians fail to run the diagnostics modules, instead relying on operational indications to deduce failed hardware components. Information handling system manufacturers have little opportunity to determine if the diagnostics module was run or to determine the accuracy of the diagnostics module at detecting component failures except to test returned components for duplication of reported failures.

SUMMARY OF THE INVENTION

Therefore a need has arisen for a method and system which reduces service technician talk time for analysis of information handling system hardware component failures.

A further need exists for a method and system which enforces and verifies use of information handling system diagnostics modules to analyze hardware component failures.

In accordance with the present invention, a method and system are provided which substantially reduce the disadvantages and problems associated with previous methods and systems for diagnosis of information handling system hardware component failures. A diagnostics module of an information handling system generates a unique diagnostics code that a diagnostics engine of a service center analyzes to verify failure of an information handling system hardware component. Automated verification of the diagnostics code allows automatic dispatch of a replacement hardware component without service technician involvement.

More specifically, a diagnostics module loaded on an information handling system runs to determine hardware component failures and generates a diagnostics code that is unique to the information handling system and diagnosed failure. For instance, the diagnostics code includes a service tag unique to information handling system and a hardware component failure code, such as an identifier for the type of hardware and type of failure. A communication module sends the diagnostics code to a service center, such as through a telephone or Internet interface, for analysis by a diagnostics engine of the service center. The diagnostics engine validates the diagnostics code by confirming the unique service tag matches the service tag of a manufactured information handling system and the hardware component failure code matches a possible failure of the information handling system. For instance, the diagnostics engine confirms that the failure code is associated with a hardware component, operating system of driver version originally installed in the information handling system. If the diagnostics engine validates a component failure, a replacement is automatically ordered by a hardware failure module to be delivered by a hardware shipper without involvement of a service technician.

The present invention provides a number of important technical advantages. One example of an important technical advantage is that it reduces service technician talk time for analysis of information handling system hardware component failures. For instance, if the diagnostics code verifies failure of a hardware component, automated ordering and shipment of a replacement component is provided without using a service technician. For those instances where the diagnostics code is not verified, the diagnostics engine escalates handling of the reported failure to involve a service technician. In this manner, service technician time is used more efficiently to reduce the expense associated with service of an information handling system failure.

Another example of an important technical advantage of the present invention is that it enforces use of information handling system diagnostics modules to analyze hardware component failures. Each diagnostics code uniquely identifies the information handling system, failed component and type of failure so that attempts to order replacement components are limited to matches between the ordered component and the diagnostics code. This check enforces the running of the diagnostics module before replacement parts are ordered, thus reducing the shipment of replacement components where the original equipment has not failed. Verification is further enhanced by encryption of diagnostics codes to avoid manufacturing of fake diagnostics codes. Further security and flexibility is provided by identifying separate types of hardware components with component-specific failure codes, thus allowing freedom of diagnostics management by individual peripheral or component development teams.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Implementation of hardware diagnostics loaded on information handling systems reduces service costs by avoiding replacement of operational components as having failed. The present invention enforces the use of diagnostics through generation of a unique hardware diagnostics code that is validated at a service center to allow automated shipping of replacement parts for failed hardware components of an information handling system without intervention by a service technician. For purposes of this application, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
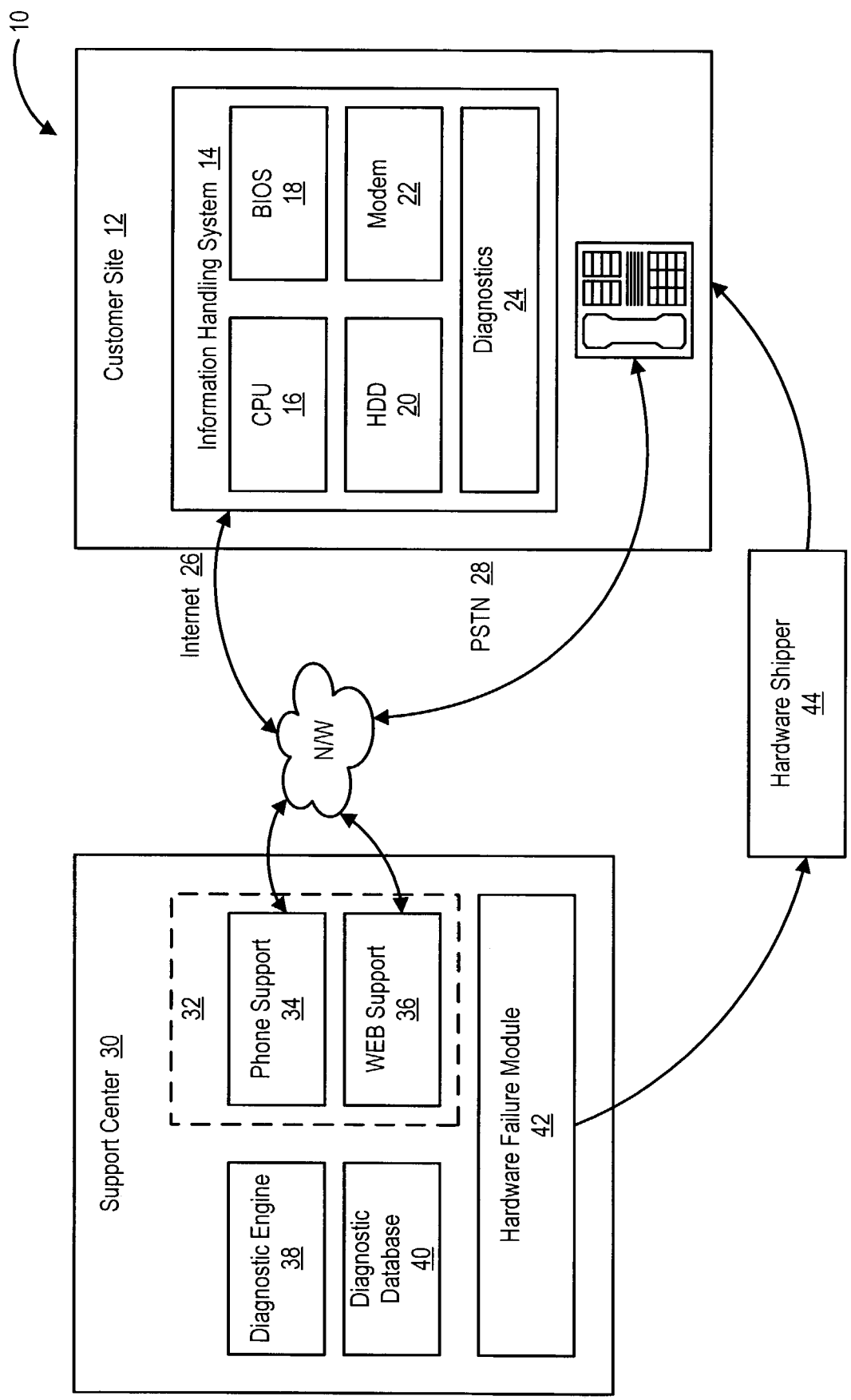
FIG. 1 depicts a block diagram of an information handling system hardware component failure diagnosis verification system.

Referring now to FIG. 1, a block diagram depicts an information handling system hardware component failure diagnosis verification system 10. A customer site 12 has one or more information handling systems 14, each information handling system operating with a variety of hardware components, such as a CPU 16, BIOS 18, hard disk drive 20 and modem 22 or other network physical interface. A diagnostics module 24 is loaded on information handling system 14 to run diagnostics on the hardware components for detecting and identifying hardware component failures. For instance, diagnostics module 24 may be loaded on information handling system 10 during manufacture or run from a removable media, such as a CD included with purchase of information handling system 10. Alternatively, diagnostics module 24 is downloaded as part of an Internet-based diagnostics, such as the System Profiler available from Dell Computer Corporation, which scans the system by first requesting a user to download and run a module on their system or even allows download of diagnostic modules for specific hardware components. If an information handling system user at customer site 12 has difficulty operating information handling system 14, the user runs diagnostics module 24 to determine if the difficulty is related to a hardware component failure. If so, the user contacts a support center 30 through a communication interface, such as Internet 26 or the Public Switched Telephone Network 28, to report the hardware component failure and order a replacement for the failed hardware component.

Inquiries from an information handling system user to support center 30 are handled through a support center user interface 32 having telephone or Web browser interfaces. Telephone inquiries from customer site 12 through PSTN 28 are answered with automated phone support module 34, such as with an interactive voice response unit (IVRU). Web browser inquiries from customer site 12 through Internet 26 are answered with an automated Web support module 26 that presents a graphical user interface to the user. Phone support module 34 and Web support module 36 each requests that the user input a diagnostics code provided by information handling system 14. Diagnostics module 24 generates a unique diagnostics code for each information handling system that identifies any detected failures of a hardware component, the type of failed hardware component and a unique identifier for the information handling system. In order to allow communication of the diagnostics code through either the phone or Web support modules, diagnostics module 24 generates a numeric value that a user may input through DTMF codes.

A diagnostics engine 38 of support center 30 accepts the diagnostics code from user interface 32 and confirms the authenticity of the diagnostics code by reference to a diagnostics database 40. For instance, diagnostics engine 38 confirms that the information handling system unique identifier matches a unique identifier of a valid system. Diagnostics engine 38 also confirms that the failed hardware component and failure types match values generated by a diagnostics module 24. For instance, the information handling system shipped hardware and software configuration is retrieved from diagnostics database 40 based on the information handling system unique identifier and compared with information provided by the diagnostics code, such as the diagnostics date and time, diagnostics results, hardware on which diagnostics was run, the number of diagnostics runs, operating system and version used on the information handling system, driver versions and other desired information. If analysis of the diagnostics codes by diagnostics engine 38 confirms a failed hardware component, a hardware failure module 42 automatically initiates shipment of a replacement part by a hardware shipper 44 to customer site 12. In this manner, the customer has failed hardware components replaced without having to talk with a service technician. Hardware failure module 42 then sends an electronic message to customer site 12 to provide an estimated replacement part delivery date.

Figure 2A:
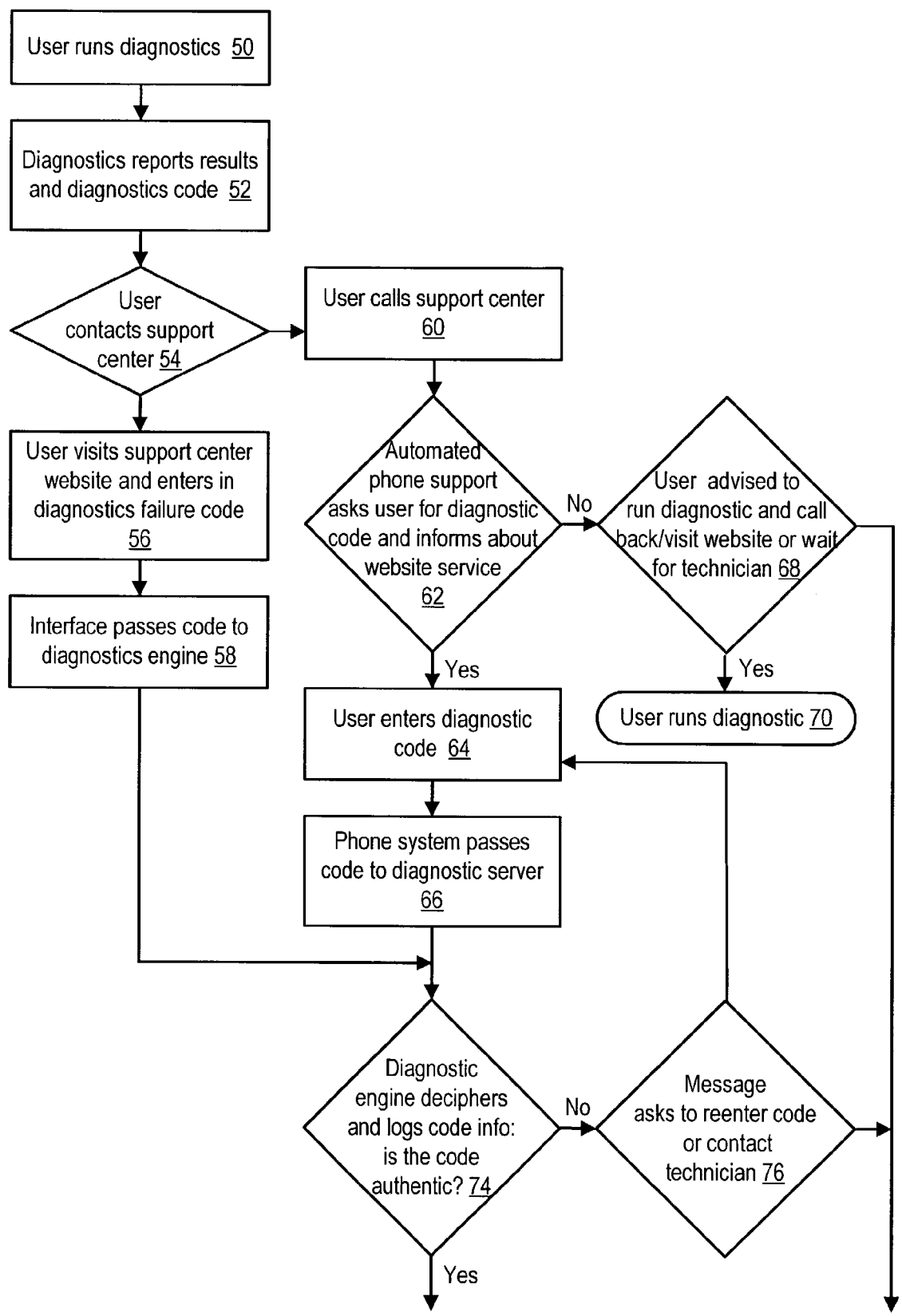
FIGS. 2A, 2B and 2C depict a flow diagram of a process for automated ordering of failed hardware components and the ordering of failed hardware components if automated ordering is not accomplished.
Figure 2B:
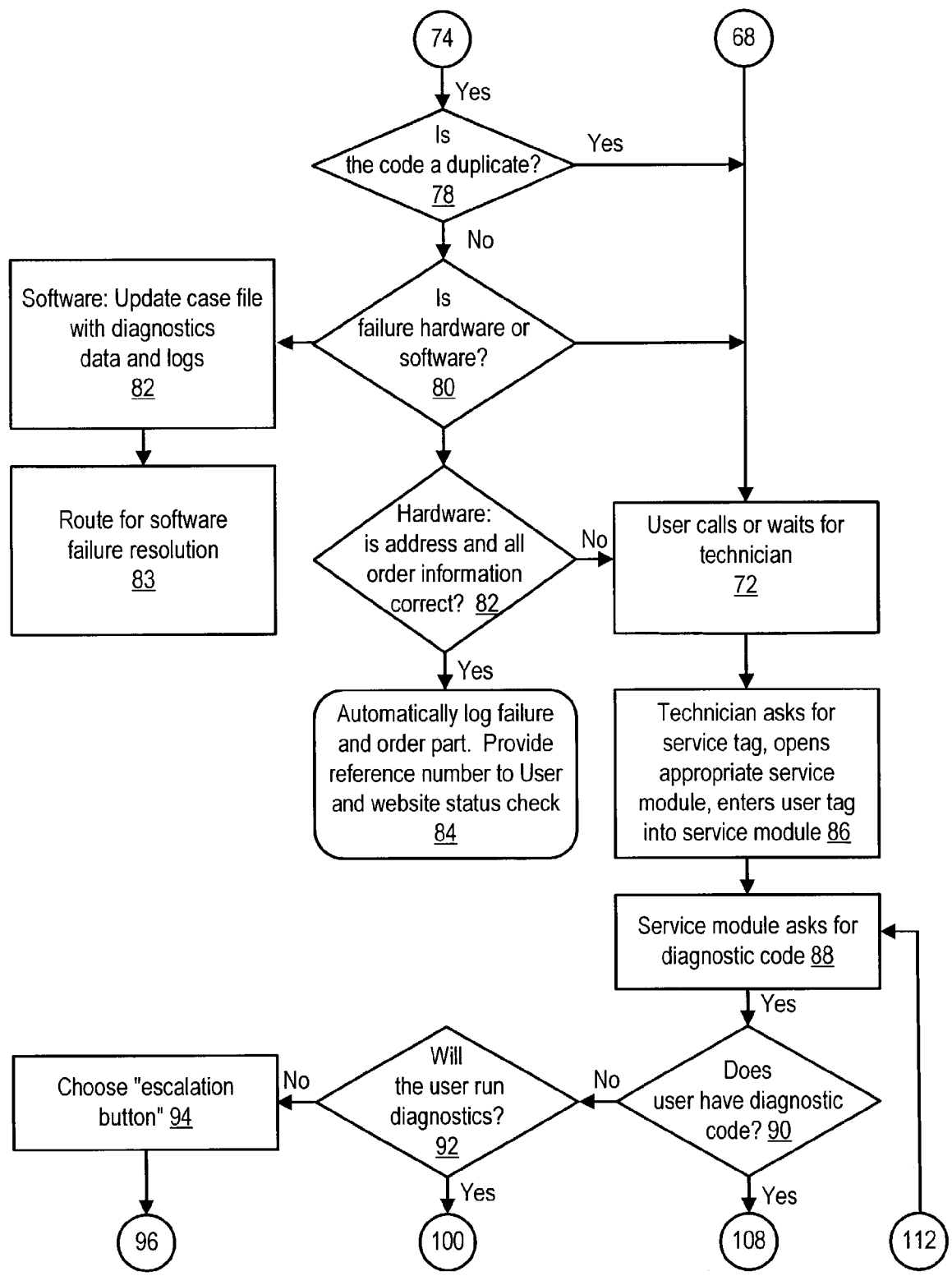
Figure 2C:
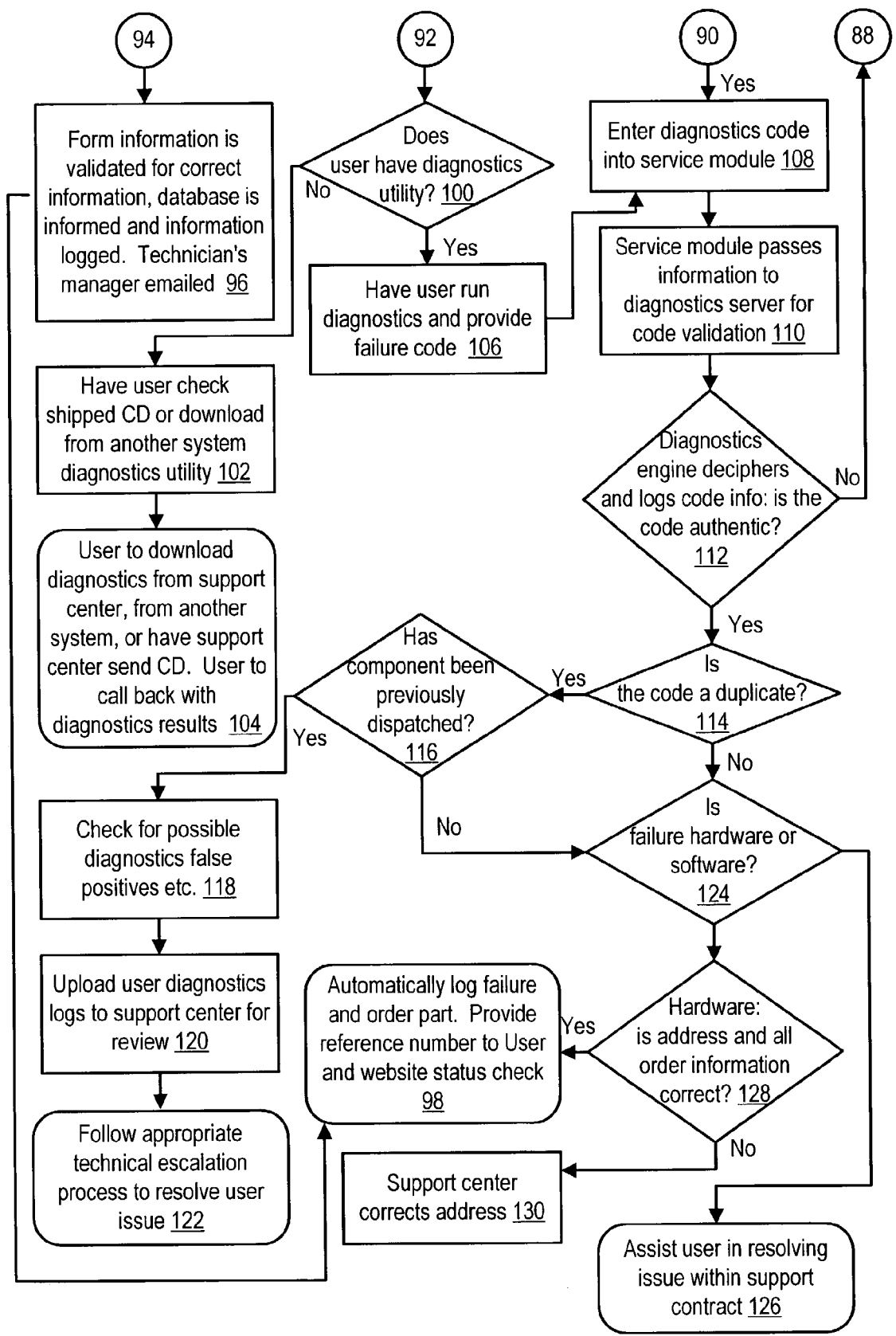

Referring now to FIGS. 2A, 2B and 2C, a flow diagram depicts the process for automated ordering of a replacement hardware component. At step 50, the user runs diagnostics module 24 on information handling system 14 and, at step 52, diagnostics module 24 reports any failed components along with a diagnostics code to the user. The diagnostics code is a numeric seventeen digit value, such as 01-35066105317-1005, that includes a hardware type identifier (i.e., 01 for a modem), an eleven digit unique identifier stored in the information handling system BIOS, and a four digit failure code specific to the hardware type (i.e., 1005 for a tone generation failure). Along with the diagnostics code, the user is provided with a phone number or Web address to report the diagnostics code to support center 30. At step 54, the user selects to interface though telephone or electronic message communication with support center 30. If the user elects to contact the support center Web site, the process continues to step 56 at which the Website requests the user to put in the diagnostics failure code. At step 58, the diagnostics failure code input by the user is provided to the diagnostics engine. If, at step 54 the user elects to place at phone call at step 60, then at step 62 an automated phone attendant suggests the user try the Website and requests the user to input the numeric diagnostics failure code at step 64 so that the phone system can forward the code to the diagnostics engine at step 66. If the user does not input the diagnostics code at step 62, then the process continues to step 68 at which the user is requested to run the diagnostics module, hold for a technician or go to the Website for help and suggestions. At step 72, the user is placed on hold to talk with a technician.

At step 74, the diagnostics engine analyzes the diagnostics code input by the user to determine whether the diagnostics code is authentic. If the code is not authentic, the process continues to step 76 where the user is requested to re-enter the diagnostics code or contact a technician at step 72. If the diagnostics code is authentic at step 74, the process continues to step 78 at which the diagnostics engine determines if the code is a duplicate, i.e., whether the same information handling system has previously experienced the same failure. If the diagnostic code is a duplicate, the process continues to step 72 to forward the user to a technician. If not, the process continues to step 80 to determine whether the failure indicated by the code relates to hardware or software. If the failure is related to software, the process continues to step 82 to update the case file with the diagnostics data and to update diagnostics logs. At step 83, software failure resolution is handled by routing the user to solutions with a goal of reducing expensive soft calls to service technicians. For instance, diagnosed software failures having known fixes, such as patches available through downloads or updated removable media, are provided automatically to the user without intervention by a service technician. Other software failures may be routed to have a voice message played to the user, to have a technical fax document faxed to the user with debug solutions and suggestions, or to have the user's browser routed to a self-help network location for analysis and debug of the software. Alternatively, the user may be routed to e-mail support, which tends to have lower costs than phone support, and ultimately to phone support.

If at step 80 a hardware failure is indicated, then at step 82 the user is requested to confirm address information for the shipping of a replacement hardware component. If the address information is not current, the process continues to step 72 to obtain current address information. If the address is current at step 82, the process continues to step 84 at which the replacement component is automatically ordered, the failure is logged and the user is provided with a reference number and Website address to check the progress of shipment of the replacement component.

Referring now to FIGS. 2A, 2B and 2C, a flow diagram depicts the process for addressing component failures that do not result in automated sending of a replacement component at step 84. At step 86, the user is switched to a service technician who obtains the information handling system service tag and opens the appropriate service modules. At step 88, the service technician requests the diagnostics code from the user. At step 90, the technician determines if the user has a diagnostics code and, if not, at step 92 requests the user to run the diagnostics module. If the user refuses or is unable to run diagnostics, at step 94 the technician chooses to escalate the service matter and at step 96 is provided with a form to determine the failed component, notifies a supervisor and, at step 98, logs the failure and arranges delivery of the hardware component to the user. In at step 92 the user instead indicates that he will run the diagnostics module, the process continues to step 100 to determine whether the user has the diagnostics module loaded on the information handling system. If no diagnostics module is loaded, the process continues to step 102 to have the user download the diagnostics module or receive a CD with the diagnostics module by mail, and then at step 104 to have the user run the diagnostics.

If at step 90 or step 106, the user is willing and able to run the diagnostics module, then the process continues to step 108 for the user to provide the diagnostics code to the technician. At step 110, the service technician provides the diagnostics code to the diagnostics engine which, at step 112, determines whether the code is authentic. If the diagnostics code is not authentic, then the process returns to step 88 to attempt to obtain a valid diagnostics code. If the diagnostics code is authentic, the process continues to step 114 to determine if the diagnostics code is a duplicate. If the diagnostics code is a duplicate, at step 118 the diagnostics module is checked to determine if a false positive fault was indicated, at step 120 the diagnostics log is uploaded to the service center for review, and at step 122 resolution of the fault is escalated to resolve the problem leading to repeat failures of the component.

If at step 114 the diagnostics code is not a duplicate, the process continues to step 124 to determine if the failure indicated by the diagnostics code is hardware or software related. If the failure is software related, the process continues to step 126 for resolution of software faults. If the failure is hardware related at step 124, the process continues to step 128 to confirm the address and contact information for the user. If necessary, the address information is updated at step 130 and at step 98 the component failure is logged and a replacement part is sent to the user.

Although the present invention has been described in detail, it should be understood that various changes, substitutions and alterations can be made hereto without departing from the spirit and scope of the invention as defined by the appended claims.

What is claimed is:

1. A method for verifying an information handling system hardware component failure diagnosis, the method comprising:

running diagnostics on an information handling system to determine a hardware component failure of the information handling system;

generating a hardware diagnostics code that uniquely identifies the information handling system hardware component failure;

sending the hardware diagnostics code to a support center;

automatically analyzing the hardware diagnostics code at the support center to verify the authenticity of the hardware component failure diagnosis; and automatically initiating shipment of a replacement hardware component for the failed hardware component.

2. The method of claim 1 further comprising:

determining that the hardware diagnostics code is not authentic; and forwarding the hardware diagnostics code to a support representative.

3. The method of claim 1 further comprising:

tracking shipment of replacement hardware components; and identifying repeat shipments of a replacement hardware component for an information handling system; and forwarding a hardware diagnostics codes associated with a repeat shipment to a support representative.

4. The method of claim 1 wherein the hardware diagnostics code comprises an information handling system unique identifier and a hardware component failure code.

5. The method of claim 4 wherein the hardware diagnostics code comprises a numeric code and sending the hardware diagnostics code further comprises sending a DTMF code.

6. The method of claim 1 further comprising:

receiving a telephone service request from a user for an information handling system failure;

determining that the user has not run diagnostics of the information handling system; and directing the user to run the diagnostics to generate the hardware diagnostics code.

7. The method of claim 6 wherein automatically analyzing the hardware diagnostics code further comprises comparing the unique identification of the information handling system with a database of information handling system unique identifications.

\* \* \* \* \*